(12) United States Patent
Buesser et al.

(10) Patent No.: US 12,197,895 B2
(45) Date of Patent: Jan. 14, 2025

(54) DIALOGUE- AND MACHINE LEARNING-FACILITATED CODE DEVELOPMENT

(71) Applicant: International Business Machines Corporation, Armonk, NY (US)

(72) Inventors: Beat Buesser, Ashtown (IE); Yufang Hou, Dublin (IE); Akihiro Kishimoto, Setagaya (JP); Radu Marinescu, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 141 days.

(21) Appl. No.: 17/552,592

(22) Filed: Dec. 16, 2021

(65) Prior Publication Data
US 2023/0195427 A1    Jun. 22, 2023

(51) Int. Cl.
| | | |
|---|---|---|
| *G06F 8/33* | (2018.01) | |
| *G06F 16/242* | (2019.01) | |
| *G06N 20/00* | (2019.01) | |

(52) U.S. Cl.
CPC .............. *G06F 8/33* (2013.01); *G06F 16/243* (2019.01); *G06N 20/00* (2019.01)

(58) Field of Classification Search
None
See application file for complete search history.

(56) References Cited

U.S. PATENT DOCUMENTS

| | | |
|---|---|---|
| 5,671,416 A | 9/1997 | Elson |
| 8,566,789 B2 | 10/2013 | Siddaramappa et al. |
| 8,972,372 B2 | 3/2015 | Elbaum et al. |

(Continued)

FOREIGN PATENT DOCUMENTS

CA        3040108 A1 * 10/2020 ........... G06F 16/243

OTHER PUBLICATIONS

Ye et al., "Probing Semantic Grounding in Language Models of Code with Representational Similarity Analysis," arXiv, 2021, 22pg. (Year: 2021).*

(Continued)

*Primary Examiner* — Ryan D. Coyer
(74) *Attorney, Agent, or Firm* — Amin, Turocy & Watson, LLP

(57) ABSTRACT

One or more systems, devices, computer program products and/or computer-implemented methods of use provided herein relate to facilitating code development by predicting one or more code attributes and/or code portions for use in a project code to be written. A system can comprise a memory that stores computer executable components, and a processor that executes the computer executable components stored in the memory, wherein the computer executable components can comprise a dialogue component that generates a query based on a natural language request comprising a code-related attribute, and a prediction component that predicts another attribute or a code portion to satisfy the request. In an embodiment, an input dataset employed to support the influence mapping can comprise time-stamped tuple data comprising a state, an action and a reward. The code-related attribute can at least partially define a project code, of code to be written.

20 Claims, 10 Drawing Sheets

(56) References Cited

U.S. PATENT DOCUMENTS

| | | | |
|---|---|---|---|
| 9,064,005 | B2 | 6/2015 | Stensmo |
| 9,171,542 | B2 | 10/2015 | Gandrabur et al. |
| 9,946,786 | B2 | 4/2018 | Allen et al. |
| 10,754,885 | B2 | 8/2020 | Yao |
| 11,036,728 | B2 | 6/2021 | Torres et al. |
| 11,100,407 | B2 | 8/2021 | Alkan et al. |
| 11,652,755 | B1 * | 5/2023 | Mritunjai ............... H04L 69/22 370/412 |
| 2007/0061294 | A1 | 3/2007 | Parnell et al. |
| 2010/0169871 | A1 | 7/2010 | Villadsen et al. |
| 2014/0165032 | A1 | 6/2014 | Balasubramanian et al. |
| 2019/0066660 | A1 | 2/2019 | Liang et al. |
| 2019/0347363 | A1 | 11/2019 | Kishimoto et al. |
| 2020/0012954 | A1 | 1/2020 | Botea et al. |
| 2021/0027771 | A1 | 1/2021 | Hall et al. |
| 2021/0182283 | A1 * | 6/2021 | Carney ................ G06F 16/248 |
| 2021/0232393 | A1 * | 7/2021 | Muddakkagari .......... G06F 8/77 |
| 2022/0121884 | A1 * | 4/2022 | Zadeh ................. G06N 3/043 |
| 2022/0138240 | A1 * | 5/2022 | Bahrami ............. G06F 16/3332 717/120 |
| 2022/0215023 | A1 * | 7/2022 | Cheng ................ G06F 16/2457 |
| 2023/0109681 | A1 * | 4/2023 | Gotmare ................ G06N 3/04 704/9 |
| 2023/0128200 | A1 * | 4/2023 | Clement ............... G06N 3/084 717/106 |

OTHER PUBLICATIONS

Iyer, et al., "Summarizing source code using a neural attention model." In Proceedings of the 54th Annual Meeting of the Association for Computational Linguistics (vol. 1: Long Papers), pp. 2073-2083. 2016.

Alon, et al., "code2seq: Generating sequences from structured representations of code." arXiv preprint arXiv:1808.01400 (2018).

Lachaux, et al., "Unsupervised Translation of Programming Languages." arXiv:2006.03511v3 [cs.CL] Sep. 22, 2020.

Husain, et al., "Codesearchnet challenge: Evaluating the state of semantic code search." arXiv preprint arXiv:1909.09436, arXiv:1909.09436v3 [cs.LG] Jun. 8, 2020.

Github, Copilot https://copilot.github.com/, GitHub Inc. © 2021, Retrieved from the Internet: Nov. 4, 2021.

Github, "elastic/elasticsearch," https://github.com/elastic/elasticsearch, GitHub Inc. © 2021, Retrieved from the Internet: Nov. 4, 2021.

Botea et al., "Generating Dialogue Agents via Automated Planning", arXiv:1902.00771v1 [cs.AI] Feb. 2, 2019.

IBM, https://w3.ibm.com/w3publisher/ibm-research/stories/in-conversation-with-researchers/ruchir-puri, Retrieved from the Internet: Nov. 4, 2021.

Mell et al., "The NIST Definition of Cloud Computing," Recommendations of the National Institute of Standards and Technology, NIST Special Publication 800-145, Sep. 2011, 7 pages.

* cited by examiner

Dialogue 402

Agent: We recommend a list of source code blocks to help you to finish the current method. Click the links to check more details.
Code block1
Code block2
Code block3

User: Code block1 looks fine. But I need a method which takes a list of student objects as the input.

Agent: We replace the input parameter in code block1 from a set of integer to a list of student object. Please click the following link to check the code:
New Code block1

User: That's fine. Thanks!

Agent: Happy to help.

IDE Environment 404

Import statement

Variable definition
Class student{}....

Method1
generate DB connection
Code block

Method2
retrieve subject and grade info
for a given student ID
Code block

Method3
retrieve subject and grade info
for a group of students

FIG. 4

DIALOGUE- AND MACHINE LEARNING-FACILITATED CODE DEVELOPMENT

BACKGROUND

In the field of artificial intelligent computer systems, machine learning (ML), a subset of artificial intelligence (AI), can employ algorithms to learn from data and create predictions based on this data. AI can learn from a data set to solve problems and to provide relevant recommendations. In some cases, AI can use self-teaching algorithms that use data minimum, visual recognition and/or natural language processing (NLP) to solve problems and to provide planning.

SUMMARY

The following presents a summary to provide a basic understanding of one or more embodiments described herein. This summary is not intended to identify key or critical elements, delineate scope of particular embodiments or scope of claims. Its sole purpose is to present concepts in a simplified form as a prelude to the more detailed description that is presented later. One or more embodiments described herein can be employed to address one or more deficiencies in existing code development techniques. In one or more embodiments described herein, systems, computer-implemented methods, apparatuses and/or computer program products can facilitate a process to assist in code development. For example, one or more embodiments described herein can be employed to predict one or more code attributes and/or code portions for use in a project code to be written.

In accordance with an embodiment, a system can comprise a memory that stores computer executable components, and a processor that executes the computer executable components stored in the memory, wherein the computer executable components can comprise a dialogue component that generates a query based on a natural language request comprising a code-related attribute, and a prediction component that predicts another attribute or a code portion to satisfy the request. In accordance with another embodiment, a computer-implemented method can comprise generating, by a system operatively coupled to a processor, a query based on a natural language request comprising a code-related attribute, and predicting, by the system, another attribute or a code portion to satisfy the request.

In accordance with yet another embodiment, a computer program product facilitating a process to develop code can comprise a computer readable storage medium having program instructions embodied therewith, the program instructions executable by a processor to cause the processor to generate, by the processor, a query based on a natural language request comprising a code-related attribute, and predict, by the processor, another attribute or a code portion to satisfy the request.

DESCRIPTION OF THE DRAWINGS

FIG. 4 illustrates a schematic diagram of another example dialogue scheme, in accordance with one or more embodiments described herein.

DETAILED DESCRIPTION

Figure 1:
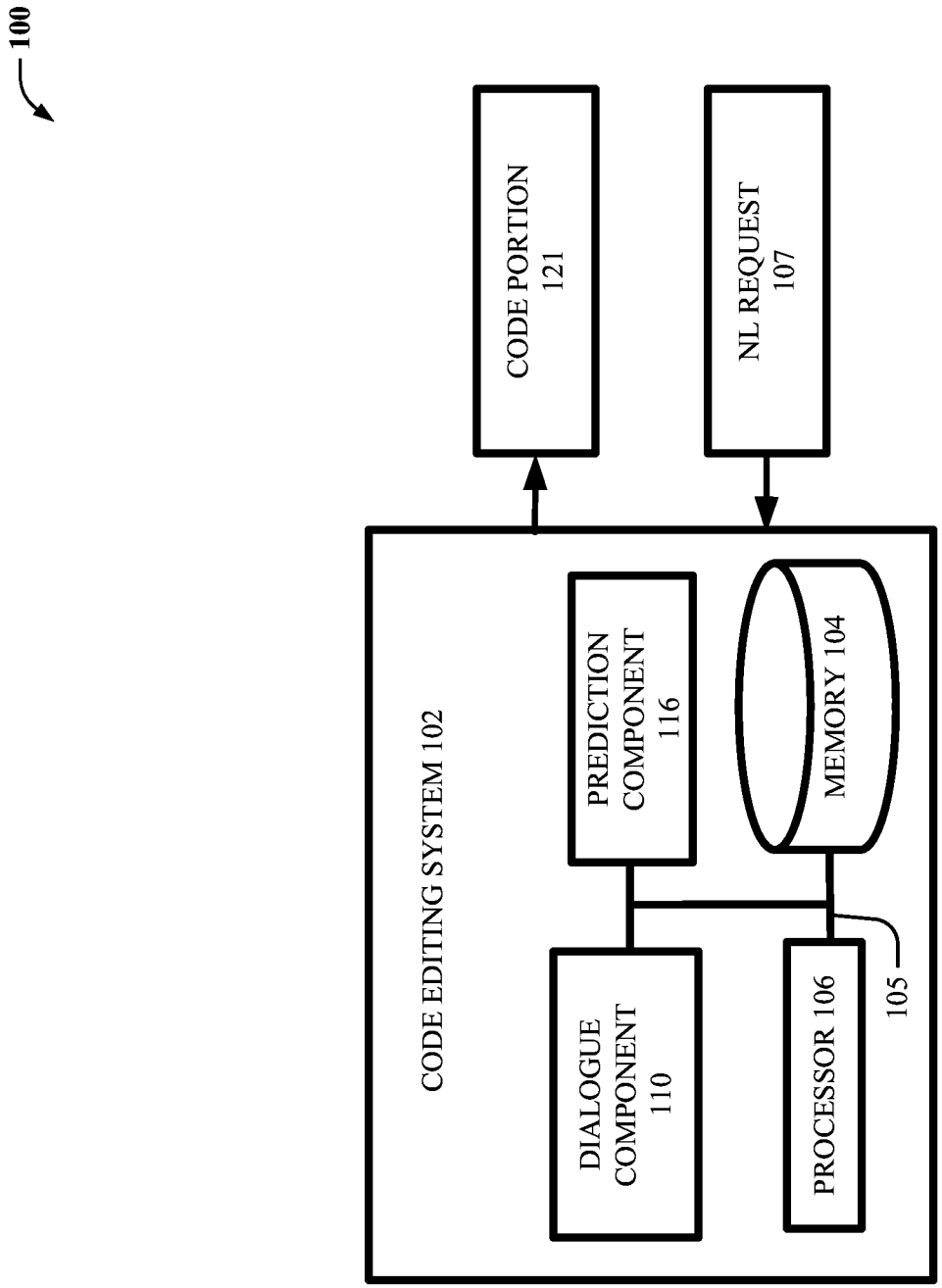
FIG. 1 illustrates a block diagram of an example, non-limiting system that can facilitate code development, in accordance with one or more embodiments described herein.

The following detailed description is merely illustrative and is not intended to limit embodiments and/or application or utilization of embodiments. Furthermore, there is no intention to be bound by any expressed or implied information presented in the preceding Summary section, or in the Detailed Description section. One or more embodiments are now described with reference to the drawings, wherein like reference numerals are utilized to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Code development, including code generation, writing, editing, analysis and/or review for any number of softwares, including applications, programs and/or the like can be a memory-intensive or resource-intensive task. In one or more cases, such memory being tested can be that of a user entity writing the code. An entity can forget or take undesired time to remember where code or one or more portions thereof are stored, how such was used and/or what naming convention was utilized for storage. That is, generally, improved efficiency, speed and/or throughput of software developing can be desired.

Described herein are one or more embodiments of a system, computer-implemented method and/or computer program product that can account for one or more deficiencies of existing techniques for code development (e.g., comprising code generation, writing, analysis, revision and/or review). Generally, provided are one or more embodiments of a system, computer-implemented method and/or computer program product that can facilitate a process to assist in code writing, such as by employing machine learning (ML). An ML model can be employed to predict one or more code attributes and/or code portions for use in a project code to be written. Further, such ML model can employ artificial intelligence (AI), AI planning, natural language processing (NLP) and/or the like to provide an integrated development environment and/or to drive a dialogue management system to elicit information for such one or more predictions.

That is, a dialogue management scheme can be employed to provide a question and answer scheme to elicit information related to an initial code-related or code-development-related request. By eliciting such requests, one or more intents of an entity writing code can be better captures, allowing for eliciting of information and/or attributes of a code being constructed. As used herein, such attributes can vary and can comprise, without being limiting, one or more names, purposes, code snippets, project dates, dates code was written, log names, internal naming conventions and/or the like that can define how and/or when a code and/or portion thereof was used, and/or one or more results of such previously existing code.

By learning such information, the one or more embodiments described herein can further employ machine learning, AI, AI planning and/or NLP to predict one or more code attributes of code, predict one or more code portions, locate one or more code portions and/or revise and/or generate one or more code portions to assist a user entity in code development of a project code. As used herein, project code can refer generally to the code being presently developed, generated and/or otherwise written, such as the code for which the initial request was made and/or for which assistance is being sought. As used herein, the prediction of code and/or a portion thereof can refer to the identification of existing code and/or a portion thereof, such as from any database, log and/or storage location accessible to the respective system employing the aforementioned machine learning.

The aforementioned prediction of one or more code attributes and/or code portions can employ natural language processing (NLP) in combination with machine learning. That is, one or more ML models employed by the one or more embodiments herein can be trained on one or more code languages. The one or more ML models employed can be trained on a set of training and/or historical data related to corresponding sets of code-related attributes and/or requests and code corresponding thereto. These correspondences and training can be employed to ground NL requests and/or code attributes in a source code space, and thus to provide an integrated and interactive development environment for a code writing entity. Training of the ML model can be facilitated after each iteration to continually improve upon natural language text to corresponding code space recognition.

Furthermore, relative to code and/or code portions located, identified, written, generated and/or revised by the one or more embodiments described herein, machine learning can be employed to thereby label, associate metadata therewith and/or locate such code and/or code portions in future iterations.

One or more embodiments are now described with reference to the drawings, where like referenced numerals are used to refer to like elements throughout. As used herein, the terms "entity", "requesting entity" and "user entity" can refer to a machine, device, component, hardware, software, smart device and/or human. In the following description, for purposes of explanation, numerous specific details are set forth in order to provide a more thorough understanding of the one or more embodiments. It is evident, however, in various cases, that the one or more embodiments can be practiced without these specific details.

Figure 2:
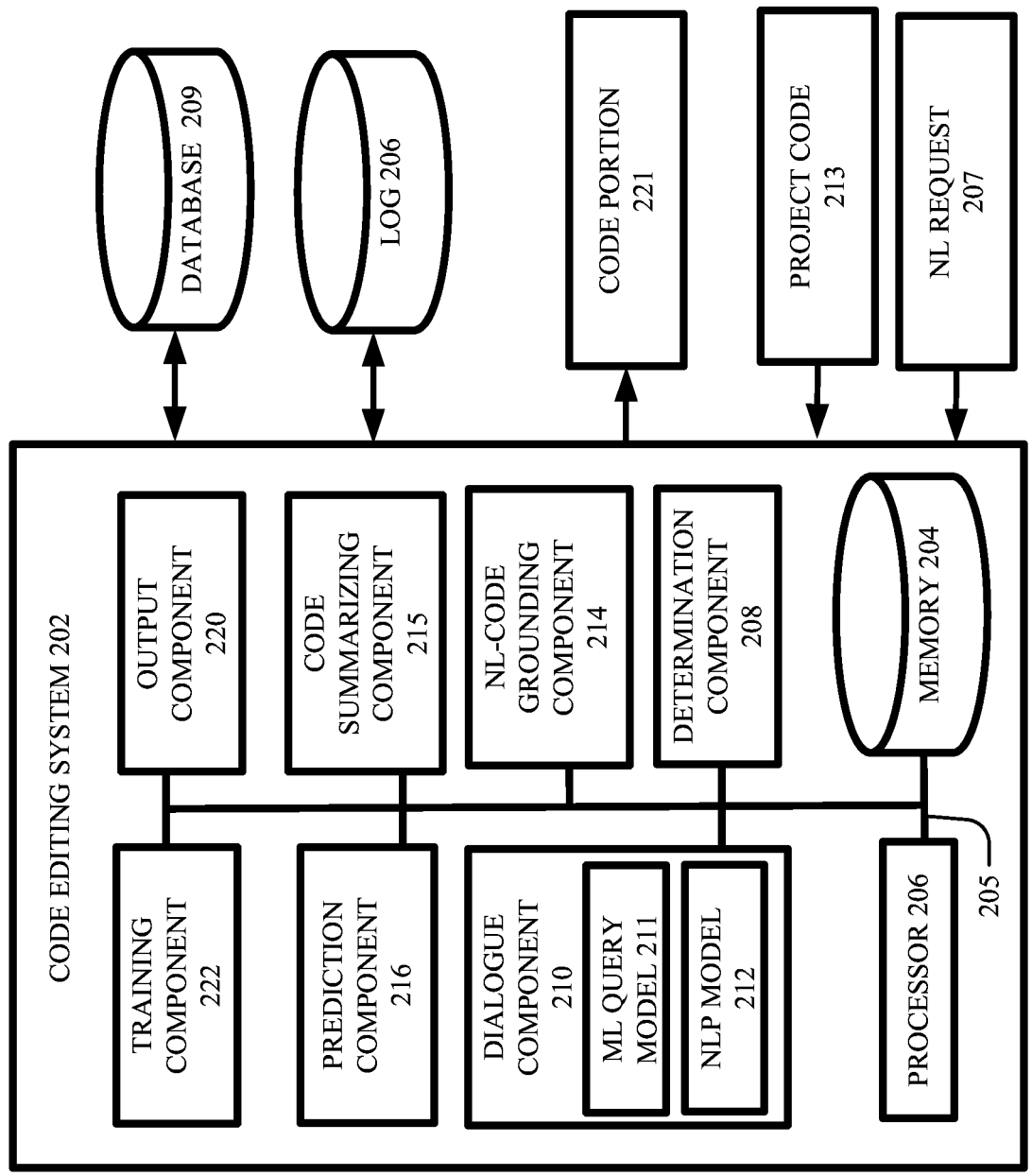
FIG. 2 illustrates a block diagram of another example, non-limiting system that can facilitate code development, in accordance with one or more embodiments described herein.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting systems 100 and/or 200 as illustrated at FIGS. 1 and 2, and/or systems thereof, can further comprise, be associated with and/or be coupled to one or more computer and/or computing-based elements described herein with reference to an operating environment, such as the operating environment 800 illustrated at FIG. 8. In one or more described embodiments, computer and/or computing-based elements can be used in connection with implementing one or more of the systems, devices, components and/or computer-implemented operations shown and/or described in connection with FIGS. 1 and/or 2 and/or with other figures described herein.

Turning first generally to FIG. 1, one or more embodiments described herein can include one or more devices, systems and/or apparatuses that can facilitate code development and/or assist a code-writing entity in code development. For example, FIG. 1 illustrates a block diagram of an example, non-limiting system 100 that can employ NLP and ML to facilitate such ends.

At FIG. 1, illustrated is a block diagram of an example, non-limiting system 100 that can facilitate a process for code development, in accordance with one or more embodiments described herein. While referring here to one or more processes, facilitations and/or uses of the non-limiting system 100, description provided herein, both above and below, also can be relevant to one or more other non-limiting systems described herein, such as the non-limiting system 200, to be described below in detail.

As illustrated at FIG. 1, the non-limiting system 100 can comprise a code editing system 102. Code editing system 102 can comprise one or more components, such as a memory 104, processor 106, bus 105, dialogue component 110 and/or prediction component 116. Generally, code editing system 102 can facilitate, in response to a code-related request and/or code-related input information, prediction of one or more code attributes and/or code portions for furthering code development. As used herein, code attributes can comprise one or more names, purposes, code snippets, project dates, dates code was written, log names, internal naming conventions and/or the like that can define how and/or when a code and/or portion thereof was used, and/or one or more results of such previously existing code. As used herein, code can comprise code portions, snippets, sections, script, code language, source code, code files and/or the like.

The dialogue component 110 can generally generate a query based on a natural language (NL) request 107, which NL request 107 can comprise a code-related attribute. The code-related attribute can be that of a code portion being sought and/or of a general intent of code being written (e.g., project code to be written), such as without mention of a code portion to be used.

The prediction component 116 can, generally, predict another code-related attribute and/or a code portion 221 to satisfy the NL request 107. As will be described in greater detail below, such prediction can be facilitated by any one or more of ML, AI, AI planning and/or NLP.

One or more aspects of a component (e.g., the dialogue component 110 and/or the prediction component 114116 can be employed separately and/or in combination, such as employing one or more of a memory or a processor of a system that includes the component to thereby facilitate generation and/or prediction of the code portion 121. That is, these components can employ the processor 106 and/or the memory 104. Additionally and/or alternatively, the processor 106 can execute one or more program instructions to cause the processor 106 to perform one or more operations by these components.

Turning next to FIG. 2, the figure illustrates a diagram of an example, non-limiting system 200 that can facilitate a process for determining an output policy based on additional information provided for an optimization model, where the additional information is provided in an informal manner, in accordance with one or more embodiments described herein. Repetitive description of like elements and/or processes employed in respective embodiments is omitted for sake of brevity. As indicated previously, description relative to an embodiment of FIG. 1 can be applicable to an embodiment of FIG. 2. Likewise, description relative to an embodiment of FIG. 2 can be applicable to an embodiment of FIG. 1.

As illustrated, the non-limiting system 200 can comprise a code editing system 202. Generally, code editing system 202 can facilitate, in response to a code-related request and/or code-related input information, prediction of one or more code attributes and/or code portions for furthering code development. General operations that can be executed by the code editing system 202 can comprise, but are not limited to, dialogue generation to elicit information from a code-writing entity, prediction of a code-related attribute, prediction of a code portion, access of code-related logs, grounding of an NL request in a code space, generation of a new code portion, revision of an existing code portion into a new code portion, and/or training of an ML model.

The code editing system 202, as illustrated, can comprise any suitable type of component, machine, device, facility, apparatus and/or instrument that comprises a processor and/or can be capable of effective and/or operative communication with a wired and/or wireless network. All such embodiments are envisioned. For example, code editing system 202 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. Likewise, the code editing system 202 can be disposed and/or run at any suitable device, such as, but not limited to a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device.

The code editing system 202 can be associated with, such as accessible via, a cloud computing environment. For example, the code editing system 202 can be associated with a cloud computing environment 950 described below with reference to FIG. 9 and/or with one or more functional abstraction layers described below with reference to FIG. 10 (e.g., hardware and software layer 1060, virtualization layer 1070, management layer 1080 and/or workloads layer 1090).

Operation of the non-limiting system 200 and/or of the code editing system 202 is not limited to use of a single constraint input and/or to output of a single decision policy. Rather, operation of the non-limiting system 200 and/or of the code editing system 202 can be scalable. For example, the non-limiting system 200 and/or the code editing system 202 can facilitate prediction of one or more code-related attributes and/or code portions relative to one or more project codes at a time. Further, the non-limiting system 200 and/or the code editing system 202 can train more than one ML model and/or NLP model at a time, at a same time as and/or separately from the aforementioned predicting.

The code editing system 202 can comprise a plurality of components. The components can include a memory 204, processor 206, bus 205, determination component 208, dialogue component 210, NL-code grounding component 214, prediction component 216, code summarizing component 215, output component 220 and/or training component 222. Like the code editing system 102, the code editing system 202 can be operated to facilitate a process aiding a user entity in a code development task.

One or more communications between one or more components of the non-limiting system 200, and/or between an external system, such as comprising and/or facilitating access to any one or more of a database 209, log 206, NL request 207, project code 213, and/or the non-limiting system 200, can be facilitated by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

Discussion now turns to the processor 206, memory 204 and bus 205 of the code editing system 202.

For example, in one or more embodiments, code editing system 202 can comprise a processor 206 (e.g., computer processing unit, microprocessor, classical processor, quantum processor and/or like processor). In one or more embodiments, a component associated with code editing system 202, as described herein with or without reference to the one or more figures of the one or more embodiments, can comprise one or more computer and/or machine readable, writable and/or executable components and/or instructions that can be executed by processor 206 to facilitate performance of one or more processes defined by such component(s) and/or instruction(s). In one or more embodiments, the processor 206 can comprise determination component 208, dialogue component 210, NL-code grounding component 214, prediction component 216, code summarizing component 215, output component 220 and/or training component 222.

In one or more embodiments, the code editing system 202 can comprise a computer-readable memory 204 that can be operably connected to the processor 206. The memory 204 can store computer-executable instructions that, upon execution by the processor 206, can cause the processor 206 and/or one or more other components of the code editing system 202 (e.g., determination component 208, dialogue component 210, NL-code grounding component 214, prediction component 216, code summarizing component 215, output component 220 and/or training component 222) to perform one or more actions. In one or more embodiments, the memory 204 can store computer-executable components (e.g., determination component 208, dialogue component 210, NL-code grounding component 214, prediction component 216, code summarizing component 215, output component 220 and/or training component 222).

Code editing system 202 and/or a component thereof as described herein, can be communicatively, electrically, operatively, optically and/or otherwise coupled to one another via a bus 205 to perform functions of non-limiting system 200, code editing system 202 and/or one or more components thereof and/or coupled therewith. Bus 205 can comprise one or more of a memory bus, memory controller, peripheral bus, external bus, local bus, quantum bus and/or another type of bus that can employ one or more bus architectures. One or more of these examples of bus 205 can be employed to implement one or more embodiments described herein.

In one or more embodiments, code editing system 202 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical and/or quantum computing devices, communication devices and/or like devices), such as via a network. In one or more embodiments, one or more of the components of the non-limiting system 200 can reside in the cloud, and/or can reside locally in a local computing environment (e.g., at a specified location(s)).

In addition to the processor 206 and/or memory 204 described above, code editing system 202 can comprise one or more computer and/or machine readable, writable and/or executable components and/or instructions that, when executed by processor 206, can facilitate performance of one or more operations defined by such component(s) and/or instruction(s).

Turning now to the determination component 208, the determination component 208 can receive, download, transfer, upload and/or otherwise obtain an NL request 207, such as for initiating one or more predictions by the code editing system 202. Further, the determination component 208 can locate and/or retrieve a portion of, or a whole of, project code 213, which can be the code for which editing is being sought. In one or more embodiments, the NL request 207 can comprise a location of and/or a portion or more of the project code 213.

The dialogue component 210 can generally generate one or more queries based on the NL request 207. Indeed, the dialogue component 210 can employ a query and answer system to generate continued iterations of queries to thereby elicit information, such as additional code-related attributes (e.g., in addition to that provided at/with the NL request 207). This can facilitate narrowing of information such as can be employed by the prediction component 216.

One or more dialogue queries can be submitted, such as by any suitable user entity interface, such as to elicit information including, but not limited to, any code-related attribute, location of a code portion and/or one or more general intents of a user entity relative to code development. Such intents can include a desired outcome, a desired result of a code and/or the like. That is, as compared to merely conducting a keyword search based on the NL request 207, additional information can be elicited to better capture the intent of the user entity and/or to better capture attributes of the project code being written.

The dialogue component 210 can comprise and/or otherwise employ an ML query model 211. The ML query model 211 can be located internal and/or external to the non-limiting system 200 and/or code editing system 202. Query types can comprise, but are not limited to, requesting further code attributes, requesting clarification of NL text, inquiring about code language, location, writer, last access date, code writing date and/or naming conventions, and/or requesting further intents (e.g., outcomes and/or results desired) as an output of a written code (e.g., what the user entity is seeking for the code to do). Indeed, using any one or more of these types, the ML query model 211 can iteratively extract relevant information from a user entity.

In connection with the prediction component 216, the dialogue component 210 further can provide the one or more predictions of code portions and/or a message that a suitable code portion and/or a related code attribute cannot be found and/or is unknown.

In one embodiment, the ML query model 211 can function using states and actions. For example, a set of variables (e.g., LANG, developer, ACCESS_DATE) can correspond to a set of states comprising assignment of these variables to values (e.g., initial state=[LANG=Unknown, USER=Unknown, ACCESS_DATE=Unknown]). An action can correspond to a question that seeks to find an assignment to a variable. For example, action find-lang can be related to a question "In which language is the code written?". A goal state can be employed such as being defined by start of searching/updating for files/code blocks corresponding to a state where one or more variables are known. Indeed, a dialogue scheme can be generated employing such planning system with aforementioned state and action definitions.

The ML query model 211 can be trained on training data and/or historical data comprising query and answer pairings. AI planning can be employed by the ML query model 211. The ML query model 211 further can be iteratively trained, such as employing the training component 222, to further update approaches and/or knowledge databases relative to each dialogue conducted, or at any other suitable training frequency.

The dialogue component 210 can comprise and/or otherwise employ an NLP model 212. The NLP model 212 can be located internal and/or external to the non-limiting system 200 and/or code editing system 202. NLP model 212 can analyze semantics of the initial NL request 107 and/or of any entity response returned in relation to any query. The NLP model 212 can employ any suitable algorithm, such as a standard entity recognition algorithm and/or the like to analyze user utterances.

The NLP model 212 can function in cooperation with the NL-code grounding component 214. The NL-code grounding component 214 can generally provide cross-modality co-referencing between NL information and a code source space, such as an integrated development environment (IDE). That is, based on output data from the NLP model 212 and/or on the NL request 107 and/or query responses, the NL-code grounding component 214 can provide said conversion.

For example, an input can be text from a user entity and/or a specified code block identified in a particular language. The NL-code grounding component 214 can ground the text (or NLP model 212 output data) to a part of an abstract syntactic tree (AST) of a code block (e.g., ground "a list as the input parameter" to the corresponding AST node(s)). A corpus can be annotated that can link one or more pieces of response information in text format to the corresponding AST nodes) of the code snippet.

To facilitate such conversion from NL text to source code space, NL-code grounding component 214 (and/or an ML model thereof) can be trained on training data and/or historical data comprising text and source code pairings. Additional training can include provision of code in varying languages to thereby expand the available "repertoire" of the NL-code grounding component 214. The NL-code grounding component 214 (and/or an ML model thereof) further can be iteratively trained, such as employing the training component 222, to further update approaches and/or knowledge databases relative to each dialogue conducted, or at any other suitable training frequency.

The prediction component 216 can predict another attribute, in addition to the code-related attribute provided at the NL request 207, and/or can predict a code portion 221 to satisfy the NL request 207. Such prediction can include locating a code portion 221 and/or locating a code source and extracting the code portion 221, such as based on the NL request 207 and/or any output data from the dialogue component 210 and/or NL-code grounding component 214. For example, the prediction component 216 can employ code space converted representations to search for suitable code portions to satisfy the NL request 207.

The searching, such as elastic searching, performed by the prediction component 216 can comprise access to one or more code databases 209 and or code and/or development logs 206. The databases 209 and/or logs 206 can be located internal to or external to the code editing system 202 and/or non-limiting system 200. Logs 206 can comprise data and/or metadata providing development dates, access dates, user entity name, developer entity (e.g., code constructing entity) name, code name schemes and/or the like. Databases 209 can comprise code portions, whole code, source code and/or metadata describing purpose, results and/or other useful information relative to such data.

Figure 3:
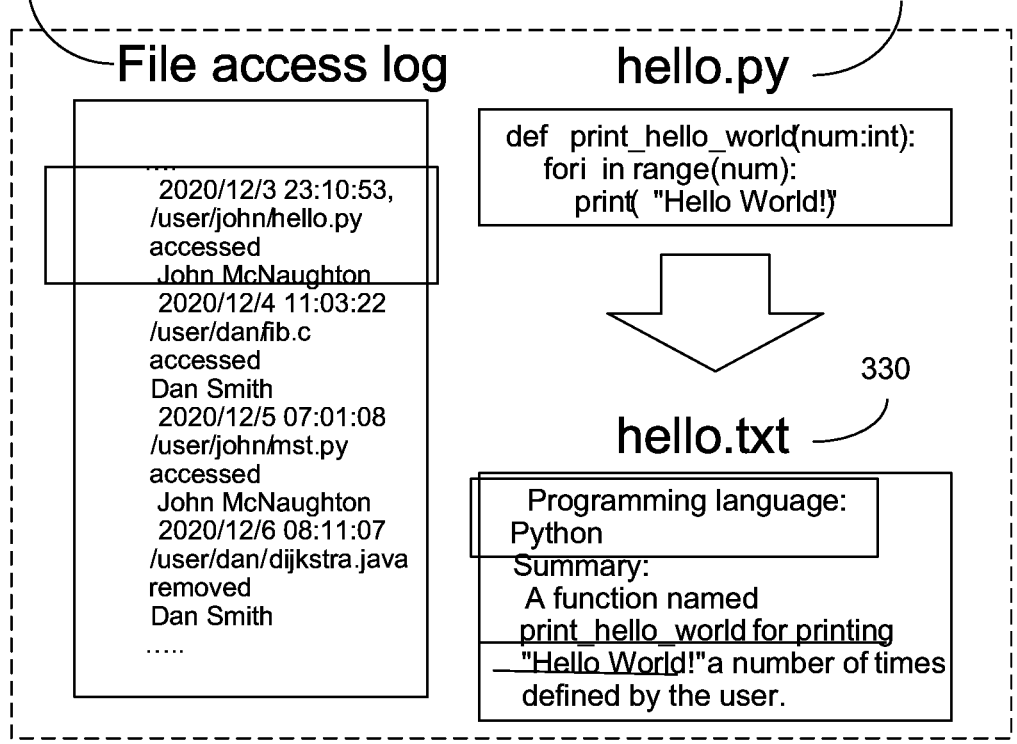
FIG. 3 illustrates a high-level schematic diagram of an example dialogue scheme, in accordance with one or more embodiments described herein.

For example, turning briefly to FIG. 3, and also still referring to FIG. 2, an example dialogue scheme 300 is illustrated. As depicted, exemplary dialogue 302 can be employed, such as using one or more queries related to code name, language, purpose and time last accessed. A user entity can interact with the respective dialogue component, which can generate and/or provide information to a chatbot. The chatbot/dialogue interface can be part of the Integrated Development Environment (IDE) 304. Information received by the chatbot from the suer entity can be employed to retrieve one or more relevant code files from a file system. For example, as shown at IDE 304, a file access log 306 can be accessed, such as by the prediction component 216, and relative to the dialogue 302, to provide a code portion 321 and/or a dialogue response 330 summarizing the code portion 321 and/or location thereof. In addition, the respective code editing system, such as the respective code summarizing component can generate a summary, such as including description of functionality of the retrieved code portion 321, which can be provided via the chatbot to the user entity.

Turning next to FIG. 4, and also still referring to FIG. 2, another example dialogue scheme is illustrated. As depicted at dialogue scheme 400, one or more aspects of dialogue scheme 300 can be extended to an integrated development environment (IDE) 404. Generally, dialogue scheme 400 illustrates the use of project code, user utterances in NL and/or one or more code attributes to determine additional classes, methods, functions of code and/or actual code portions.

In the example, the chatbot/dialogue interface can be integrated in the IDE 404. In particular, as illustrated via the dialogue 402, the user entity can be developing code and can be searching for a method that was written some time ago but which the user entity is unable to locate. The user entity can interact with a respective code editing system, such as via a chatbot interface. The code editing system, such as the respective dialogue management component, can elicit relevant information required to retrieve the piece of code desired by the user. In the illustrated example, the user entity was looking for a method that can take as input a list of students and can retrieve student grades. Using the information elicited from the user entity, the respective code editing system, such as the respective prediction component, can search one or more logs, access logs, databases and/or the like to locate a code portion providing a method that can satisfy the functionality described by the user entity via the chatbot. Subsequently, the code editing system can present the method (e.g., code portion) to the user entity in the IDE, such as via the chatbot, and further can invite the user to analyze the provided method.

As depicted at FIG. 4, prediction component 216 can provide more than one suggested code portion 421. Also as depicted, output component 220 can provide a revised (e.g., new) code portion 431 based on an existing code portion 421 (e.g., block1 at FIG. 4).

That is turning again to FIG. 2, in addition to the one or more suggested code portions 221 that can be predicted (e.g., located, referenced, pointed to and/or provided) by the prediction component 216, the output component 220 can provide a new code portion. The new code portion can be based on an existing code portion 221, such as being a modification to the existing code portion 221 based on an output of the prediction component 216. For example, the output component can employ a language-code grounding analysis (e.g., by the NL-code grounding component 214), an AST tree of the current IDE and/or one or more predicted user intents (e.g., by the prediction component 216) to generated one or more revised code blocks, such as replacing some node of a specific code block's AST tree with a new node. That is, the output component 220 can carry out suitable insert, delete and/or replace operations accordingly in a specific code block.

In one example, the prediction component 216 can retrieve existing code that can satisfy requirements of a user entity. The code summary engine (e.g., code summarizing component 215) can generate and/or provide an already generated text summary of one or more code portions and can employ the summaries to search for one or more code portions relevant to the user entity (e.g., to satisfy the requirement). In one or more embodiments, the code summarizing component 215 and/or prediction component 216 can employ a log 206 and/or database 209 providing an index over code languages and/or types accessible to the code editing system 202 and/or to the non-limiting system 200, which index can be employed by the code summarizing component 215 and/or prediction component 216.

Any one of the aforementioned components, and also the training component 222, can function in cooperation with the code summarizing component 215. The code summarizing component 215 can employ any suitable model and/or algorithm, such as an ML model or AI model, to train on and/or generate databases, data and/or metadata related to one or more code languages. One or more summaries of data related to one or more code languages can be created, such as in the form of one or more indexes to be accessed by the code editing system 202, such as by the prediction component 216. This can facilitate efficient prediction of a code portion 221.

Further, the output component 220 and/or code summarizing component 215 can facilitate generating metadata related to Rename files, create files and/or store mapping index of metadata/name.

The code editing system 202 also can comprise a training component 222. As indicated above, the NL model 212, ML query model 211, NL-code grounding component 214 and/or any other ML, AI and/or NLP model employed by the code editing system 202 can be trained on suitable training data, historical data and/or data from a current and/or previous iteration of use of the code editing system 202. Training can be provided at any suitable frequency, such as in relation to each individual iteration of use of the code editing system 202 and/or as selectively determined, such as by a user entity.

Figure 5:
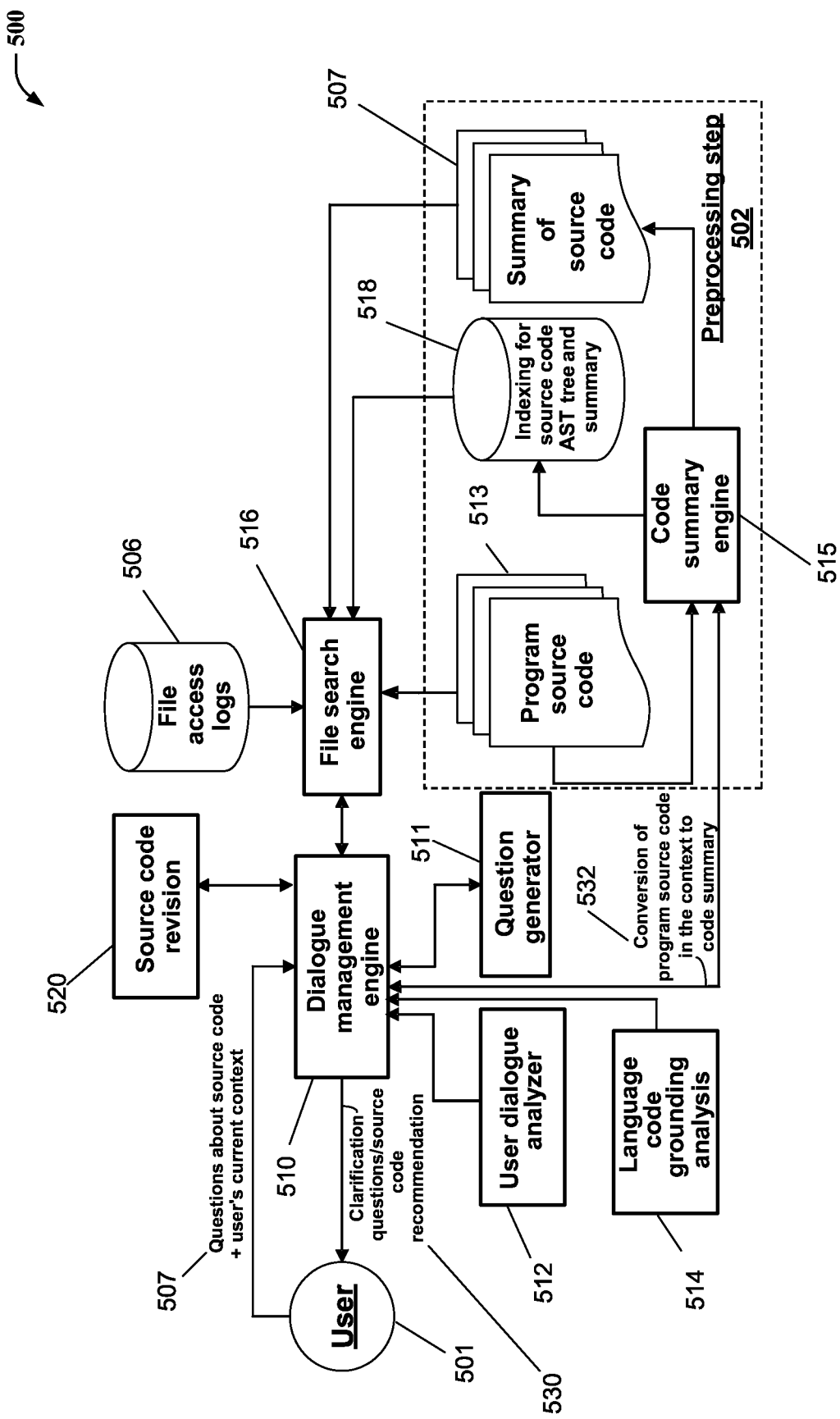
FIG. 5 illustrates a schematic representation of a process flow to facilitate code development, in accordance with one or more embodiments described herein.

Turning now to FIG. 5, illustrated is a schematic representation of one or more operations that can be performed by the non-limiting system 200 and/or by the code editing system 202. Repetitive description of like elements and/or processes employed in respective embodiments is omitted for sake of brevity.

In a pre-processing step 502, a code summary engine 515 (e.g., code summarizing component 215) can employ any training source codes 514 and/or summaries 507 of those source codes, which can be in plural languages, to generate indexing 518 for the source code, including an AST tree and associated summary. This information 518 can be employed by the file search engine 516 (e.g., prediction component 216) relative to a NL request 507 (e.g., NL request 207) from a user entity (e.g., user 501). The file search engine 516 further can employ a program source code 513, such as the project code (e.g., project code 213), and can access one or more file/code access logs 506 (e.g., logs 206).

In addition, one or more outputs from the dialogue management engine 510 (e.g., dialogue component 210), can be provided to define the search and/or prediction conducted by the file search engine 516 (e.g., prediction component 216). For example, the dialogue management engine 510 (e.g., dialogue component 210) can receive feedback from a user dialogue analyzer 512 (e.g., NLP model 212), a question generator (e.g., ML query model 211), language code grounding analysis 514 (e.g., NL-code grounding component 214) and/or code summary engine (e.g., code summarizing component 215). The dialogue analyzer 512 (e.g., NLP model 212) can analyze natural language and/or semantics of the NL request and/or of any other response from the user entity (e.g., user 501). Data output from the user dialogue analyzer 512 (e.g., NL model 212) can be employed by the question generator 511 (e.g., ML query model 211) to generate one or more additional queries to be provided to the user entity (e.g., user 501) to elicit further information regarding a code portion sought. Likewise, data output from the user dialogue analyzer 512 (e.g., NL model 212) can be employed by the language code grounding analysis 514 (e.g., NL-code grounding component 214) to convert one or more code attributes therefrom into one or more variables in a different modality, such as of a suitable source code space.

In response to one or more of these operations, one or more queries 530, such as clarification questions, can be provided to the user entity (e.g., user 501) by the dialogue management engine (e.g., dialogue component 210). Alternatively, where a prediction is provided by the file search engine 516 (e.g., prediction component 216), one or more suggested code portions (e.g., code portion 221) can be provided to the user entity (e.g., user 501).

Furthermore, to facilitate learning, training and/or updating of the respective system (e.g., code editing system 202), the dialogue management engine (e.g., dialogue component 210) can provide one or more conversions 532 of program source code (e.g., representations in a source code space) related to NLP context to the code summary engine 515 (e.g., code summarizing engine 515). This data can be suitably stored, such as by the code summary engine (e.g., code summarizing component 215) for use in future iterations of the respective system (e.g., code editing system 202).

Figure 6:
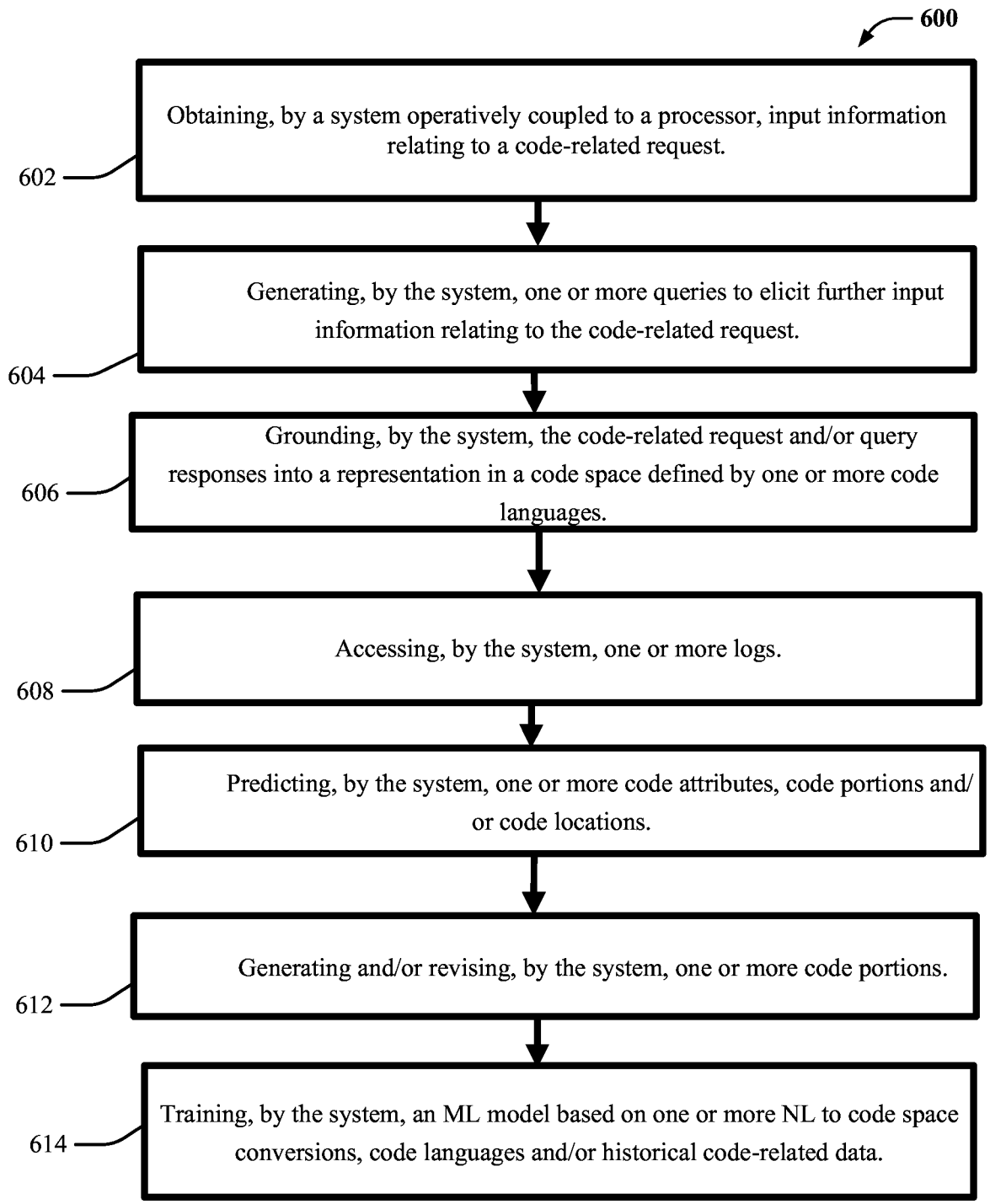
FIG. 6 illustrates a process flow for facilitating code development, in accordance with one or more embodiments described herein.

Next, FIG. 6 illustrates a flow diagram of an example, non-limiting method 600 that can facilitate code development and/or assistance in code development, in accordance with one or more embodiments described herein, such as the non-limiting 200 of FIG. 2. While the non-limiting method 600 is described relative to the non-limiting system 200 of FIG. 2, the non-limiting method 600 can be applicable also to other systems described herein, such as the non-limiting system 100 of FIG. 1. Repetitive description of like elements and/or processes employed in respective embodiments is omitted for sake of brevity.

At 602, the non-limiting method 600 can comprise obtaining, by a system (e.g., determination component 208 of code editing system 202) operatively coupled to a processor, input information relating to a code-related request. Such input information can comprise one or more code attributes, code portions and/or project code metadata.

At 604, the non-limiting method 600 can comprise generating, by the system (e.g., dialogue component 210 of code editing system 202), one or more queries to elicit further input information relating to the code-related request.

At 606, the non-limiting method 600 can comprise grounding, by the system (e.g., NL-code grounding component 214 of code editing system 202), the code-related request and/or query response(s) into a representation in a code space defined by one or more code languages.

At 608, the non-limiting method 600 can comprise accessing, by the system (e.g., prediction component 216 of code editing system 202), one or more logs, such as data logs, user logs and/or code logs communicatively connected to the system.

At 610, the non-limiting method 600 can comprise predicting, by the system (e.g., prediction component 216 of code editing system 202), one or more code attributes, code portions and/or code locations.

At 612, the non-limiting method 600 can comprise generating and/or revising, by the system (e.g., output component 220 of code editing system 202), one or more code portions.

At 614, the non-limiting method 600 can comprise training, by the system (e.g., training component 222 of code editing system 202), an ML model based on one or more NL to code space conversions, code languages and/or historical code-related data.

Figure 7:
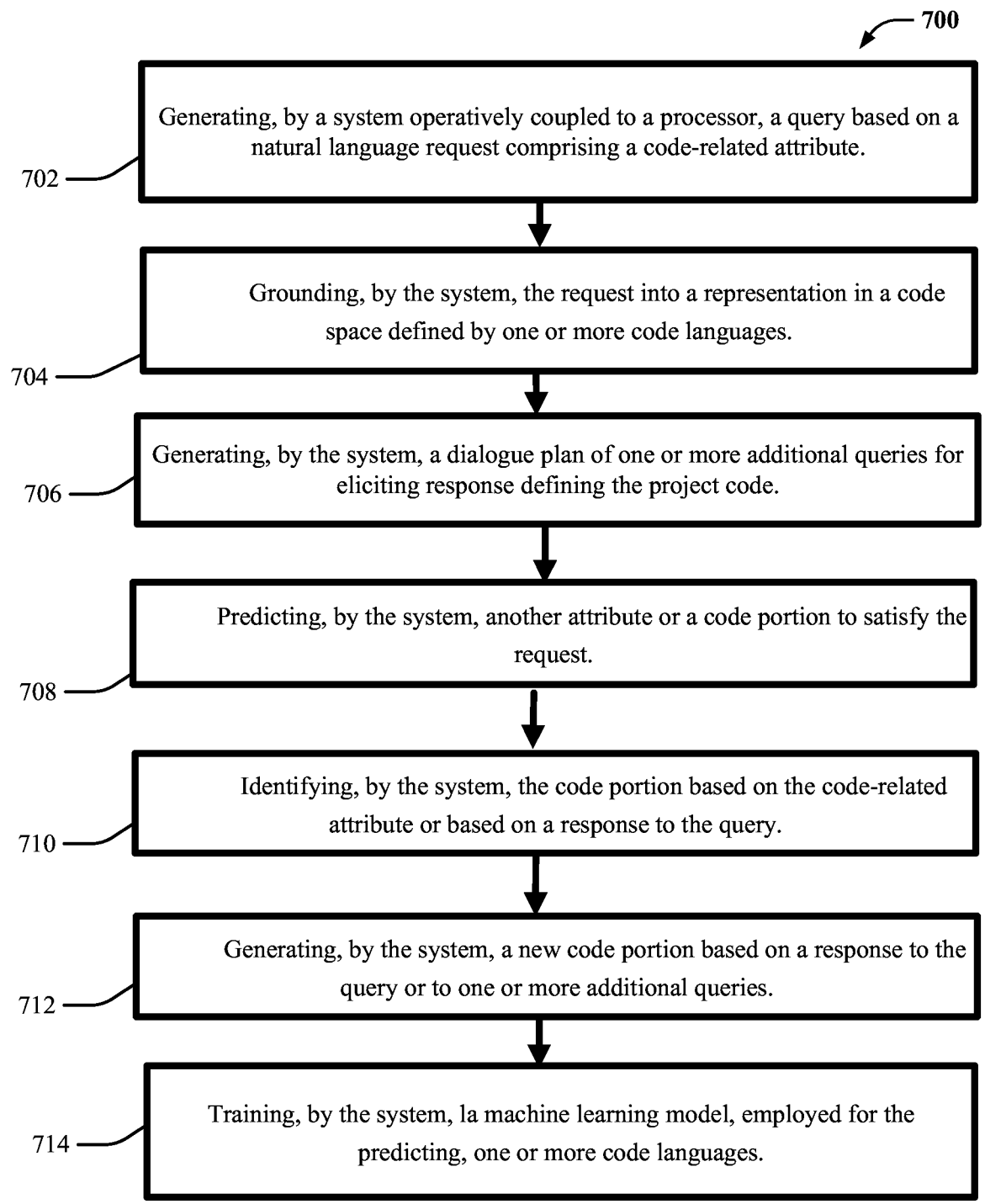
FIG. 7 illustrates another process flow for facilitating code development, in accordance with one or more embodiments described herein.

Next, FIG. 7 illustrates a flow diagram of an example, non-limiting method 700 that can facilitate code development and/or assistance in code development, in accordance with one or more embodiments described herein, such as the non-limiting 200 of FIG. 2. While the non-limiting method 700 is described relative to the non-limiting system 200 of FIG. 2, the non-limiting method 700 can be applicable also to other systems described herein, such as the non-limiting system 100 of FIG. 1. Repetitive description of like elements and/or processes employed in respective embodiments is omitted for sake of brevity.

At 702, the non-limiting method 700 can comprise generating, by a system (e.g., dialogue component 210 of code editing system 202) operatively coupled to a processor, a query based on a natural language request comprising a code-related attribute.

At 704, the non-limiting method 700 can comprise grounding, by the system (e.g., NL-code grounding component 214 of code editing system 202), the request into a representation in a code space defined by one or more code languages.

At 706, the non-limiting method 700 can comprise generating, by the system (e.g., dialogue component 210 of code editing system 202), a dialogue plan of one or more additional queries for eliciting response defining the project code.

At 708, the non-limiting method 700 can comprise predicting, by the system (e.g., prediction component 216 of code editing system 202), another attribute or a code portion to satisfy the request.

At 710, the non-limiting method 700 can comprise identifying, by the system (e.g., prediction component 216 of code editing system 202), the code portion based on the code-related attribute or based on a response to the query.

At 712, the non-limiting method 700 can comprise generating, by the system (e.g., output component 220 of code editing system 202), a new code portion based on a response to the query or to one or more additional queries.

At 714, the non-limiting method 700 can comprise training, by the system (e.g., training component 222 of code editing system 202), a machine learning model, employed for the predicting, on one or more code languages.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

In summary, one or more systems, devices, computer program products and/or computer-implemented methods of use provided herein relate to facilitating code development by predicting one or more code attributes and/or code portions for use in a project code to be written. A system can comprise a memory that stores computer executable components, and a processor that executes the computer executable components stored in the memory, wherein the computer executable components can comprise a dialogue component that generates a query based on a natural language request comprising a code-related attribute, and a prediction component that predicts another attribute or a code portion to satisfy the request. In an embodiment, an input dataset employed to support the influence mapping can comprise time-stamped tuple data comprising a state, an action and a reward. The code-related attribute can at least partially define a project code, of code to be written.

An advantage of the aforementioned systems, computer-implemented methods and/or computer program products can be generation of a project code with improved efficiency, speed and throughput as compared to current code development techniques. That is, by employing ML, AI, AI planning and NLP, one or more factors of code development can be reduced and/or mooted, such as remembering where code is stored, how code is used and/or what naming convention was used. This can be particularly helpful relative to packages and/or code languages that are not often employed. By recommending one or more code attributes and/or code portions, and/or by generating and/or revising one or more code portions, the efficiency, speed and/or throughput of code development of a project code can be facilitated. Indeed, such operations can provide more than mere keyword searching.

Further by grounding user requests in another modality, such as by grounding NL code-related requests in a code space, such code generation can be more easily facilitated. Likewise, such grounding can be employed by a dialogue management system to further facilitate such code generation by narrowing down the aforementioned predictions, such as by eliciting further code-related information. That is, adding extra knowledge to a system in an informal manner can be made efficient, automatic, cost-effective and/or more accurate than with existing technologies and/or approaches, such as by leveraging the NLP and NL to code (e.g., NL-code) grounding. Indeed, such operations can facilitate more than mere prediction based only on an initial code-related request or non-elicited information.

In this way, where it can be difficult to determine how to proceed during code writing and/or difficult to locate previously employed code (including code portions, snippets, sections, script, code language, source code, code files and/or the like), such process(es) can be facilitated by employing ML, AI, AI planning and NLP.

Another advantage can be continual updating, learning and/or training of the employed ML, AI, AI planning and NLP. Indeed, training can be based on any one or more NL to code space conversions, code languages, code locations and/or historical code-related data. Likewise, such code-related data and/or metadata can be added by the one or more embodiments described herein to further facilitate future iterations of use of the one or more embodiments.

Indeed, in view of the one or more embodiments described herein, a practical application of the systems, computer-implemented methods and/or computer program products described herein can be efficient and ML- and NLP-aided code development. Overall, such computerized tools can constitute a concrete and tangible technical improvement in the field of artificial intelligence forecasting and/or machine learning or active learning forecasting.

One or more embodiments described herein can be, in one or more embodiments, inherently and/or inextricably tied to computer technology and cannot be implemented outside of a computing environment. For example, one or more processes performed by one or more embodiments described herein can more efficiently, and even more feasibly, provide program and/or program instruction execution, such as relative to code development, as compared to existing systems and/or techniques lacking such approach(es). Systems, computer-implemented methods and/or computer program products facilitating performance of these processes are of great utility in the field of active computer-based learning and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively employ ML, AI and/or NLP to generate, revise, write and/or predict code, as the one or more embodiments described herein can facilitate this process. And, neither can the human mind nor a human with pen and paper electronically effectively employ ML, AI and/or NLP to generate, revise, write and/or predict code, as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing one or more of the one or more operations described herein.

Figure 8:
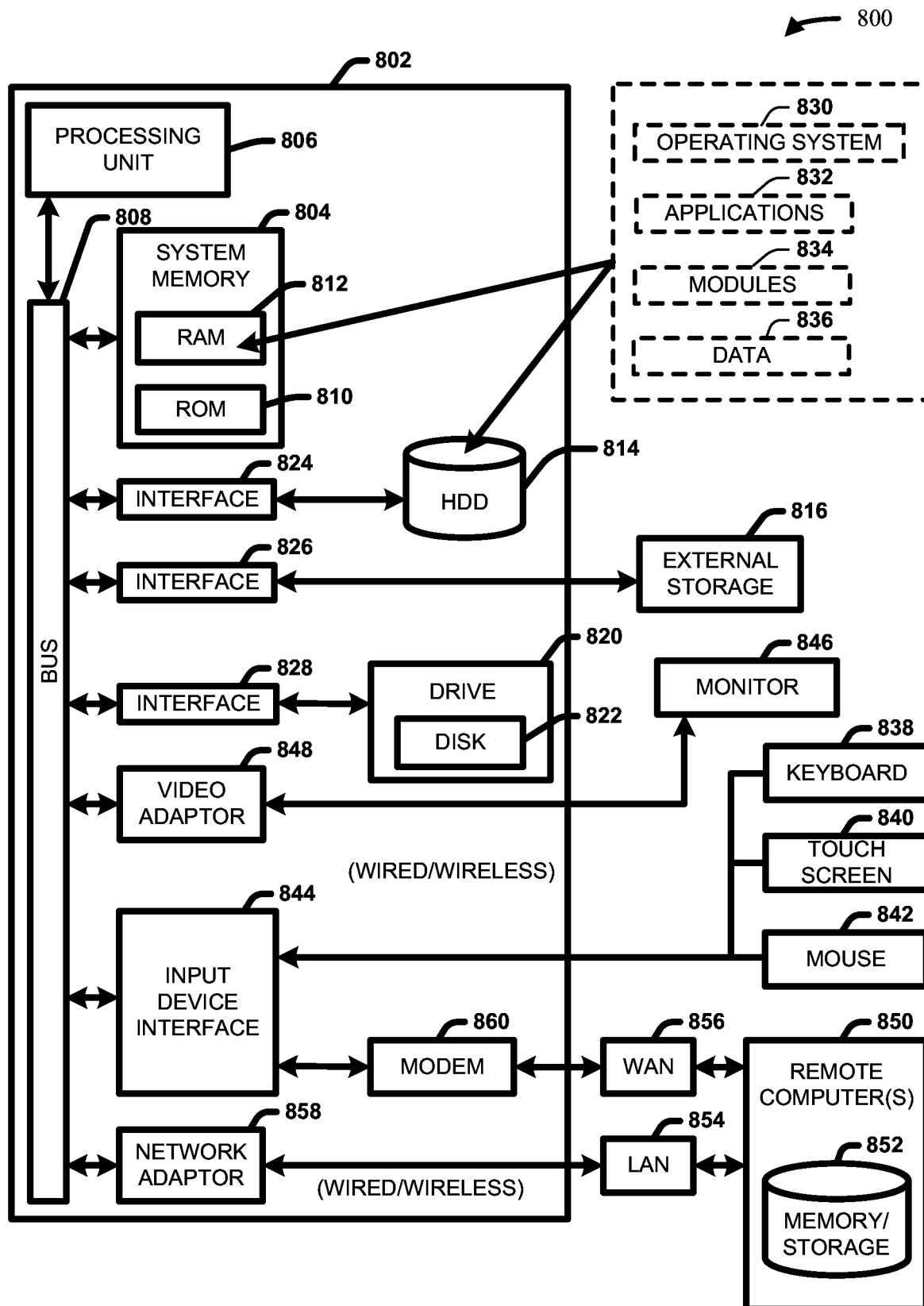
FIG. 8 illustrates a block diagram of an example, non-limiting, operating environment in which one or more embodiments described herein can be facilitated.
Figure 9:
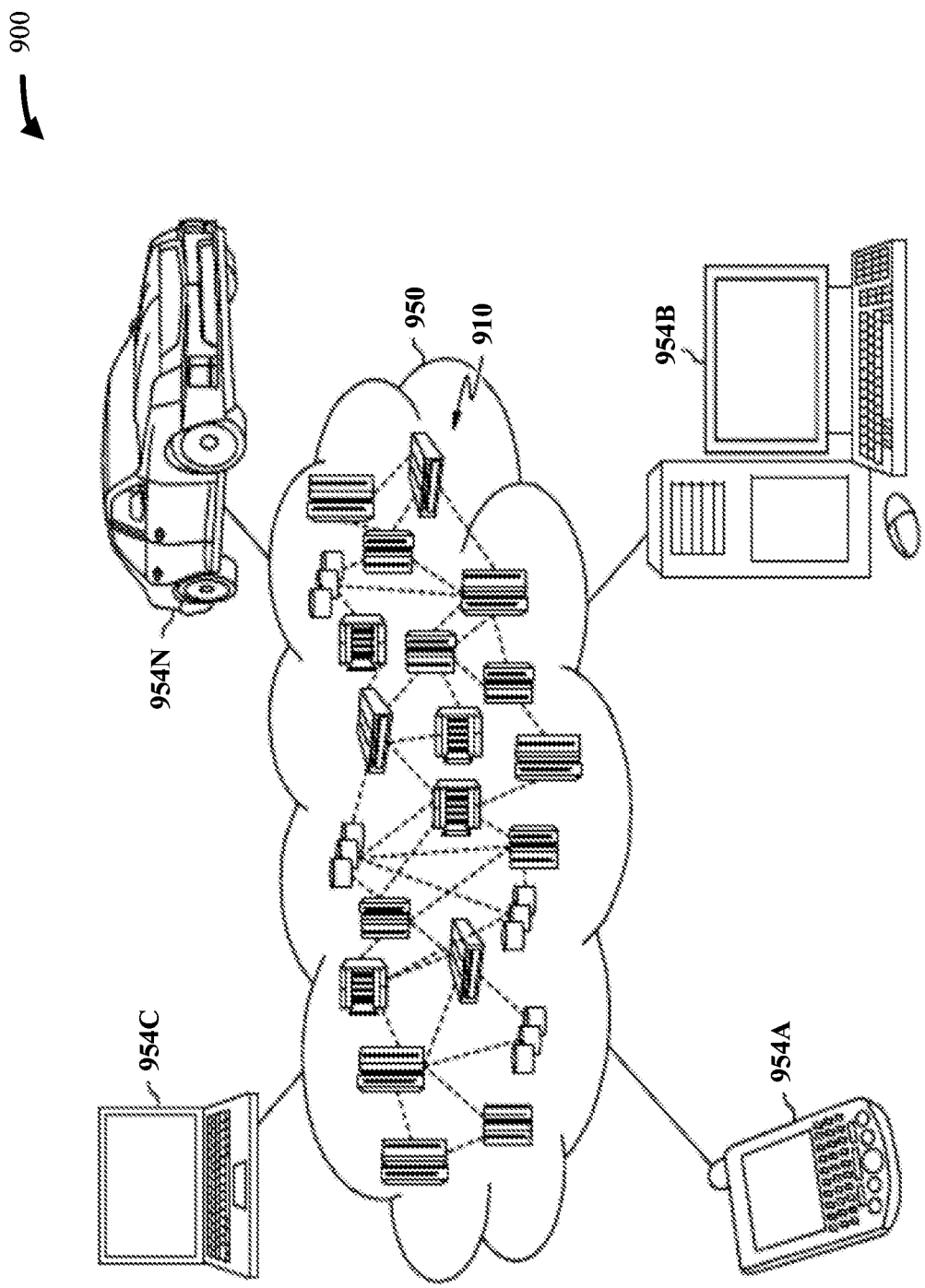
FIG. 9 illustrates a block diagram of an example, non-limiting, cloud computing environment in accordance with one or more embodiments described herein.
Figure 10:
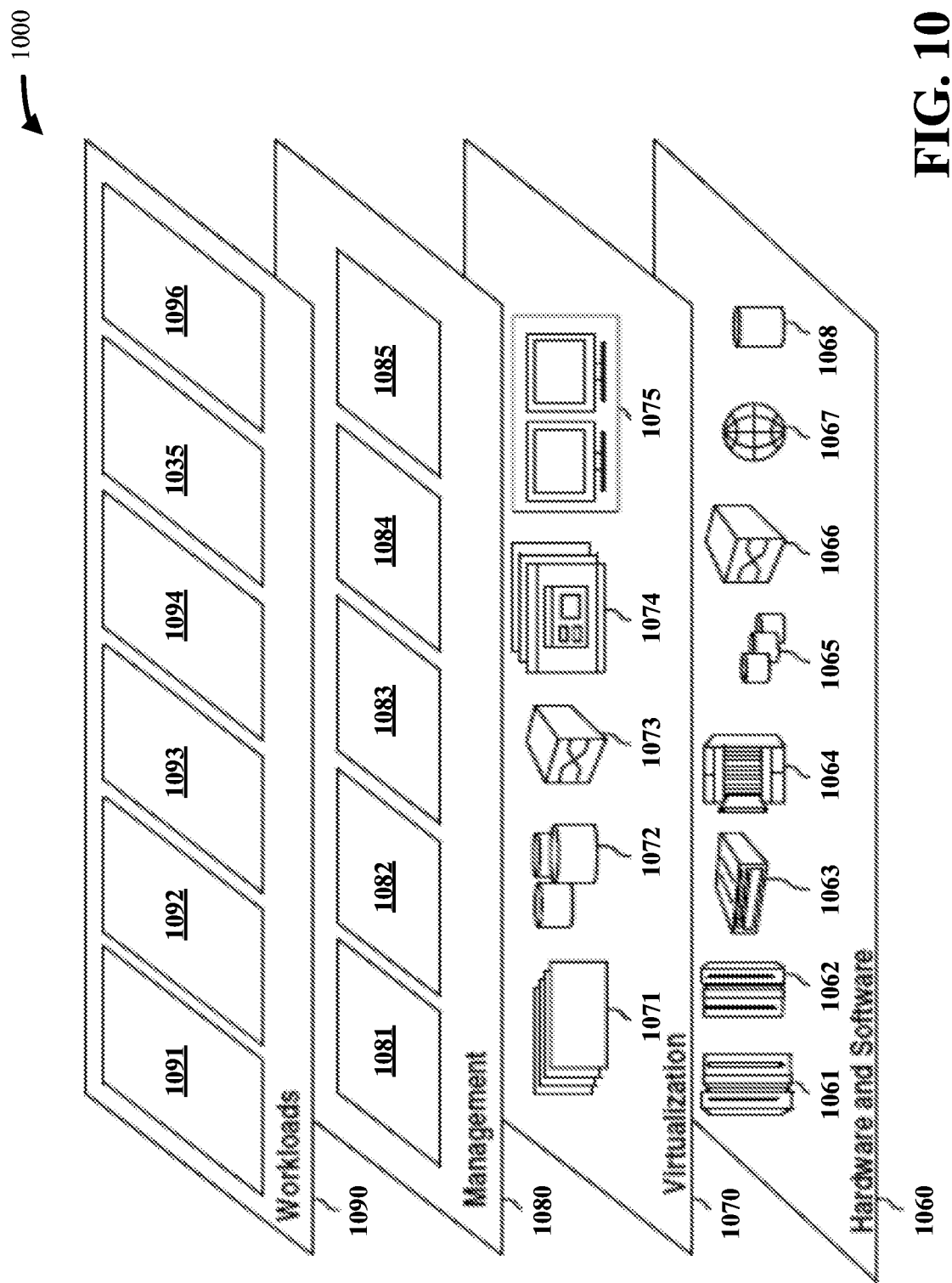
FIG. 10 illustrates a block diagram of example, non-limiting, abstraction model layers in accordance with one or more embodiments described herein.

Turning next to FIGS. 8-10, a detailed description is provided of additional context for the one or more embodiments described herein at FIGS. 1-7.

FIG. 8 and the following discussion are intended to provide a brief, general description of a suitable operating environment 800 in which one or more embodiments described herein at FIGS. 1-7 can be implemented. For example, one or more components and/or other aspects of embodiments described herein can be implemented in or be associated with, such as accessible via, the operating environment 800. Further, while one or more embodiments have been described above in the general context of computer-executable instructions that can run on one or more computers, those skilled in the art will recognize that one or more embodiments also can be implemented in combination with other program modules and/or as a combination of hardware and software.

Generally, program modules include routines, programs, components, data structures and/or the like, that perform particular tasks and/or implement particular abstract data types. Moreover, the aforedescribed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and/or the like, each of which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) and/or other optical disk storage, magnetic cassettes, magnetic tape, magnetic disk storage and/or other magnetic storage devices, solid state drives or other solid state storage devices and/or other tangible and/or non-transitory media which can be used to store specified information. In this regard, the terms "tangible" or "non-transitory" herein as applied to storage, memory and/or computer-readable media, are to be understood to exclude only propagating transitory signals per se as modifiers and do not relinquish rights to all standard storage, memory and/or computer-readable media that are not only propagating transitory signals per se.

Computer-readable storage media can be accessed by one or more local or remote computing devices, e.g., via access requests, queries and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set and/or changed in such a manner as to encode information in one or more signals. By way of example, but not limitation, communication media can include wired media, such as a wired network, direct-wired connection and/or wireless media such as acoustic, RF, infrared and/or other wireless media.

With reference still to FIG. 8, the example operating environment 800 for implementing one or more embodiments of the aspects described herein can include a computer 802, the computer 802 including a processing unit 806, a system memory 804 and/or a system bus 808. One or more aspects of the processing unit 806 can be applied to processors such as 106 and/or 206 of the non-limiting systems 100 and/or 200. The processing unit 806 can be implemented in combination with and/or alternatively to processors such as 106 and/or 206.

Memory 804 can store one or more computer and/or machine readable, writable and/or executable components and/or instructions that, when executed by processing unit 806 (e.g., a classical processor, a quantum processor and/or like processor), can facilitate performance of operations defined by the executable component(s) and/or instruction(s). For example, memory 804 can store computer and/or machine readable, writable and/or executable components and/or instructions that, when executed by processing unit 806, can facilitate execution of the one or more functions described herein relating to non-limiting system 100 and/or non-limiting system 200, as described herein with or without reference to the one or more figures of the one or more embodiments.

Memory 804 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures.

Processing unit 806 can comprise one or more types of processors and/or electronic circuitry (e.g., a classical processor, a quantum processor and/or like processor) that can implement one or more computer and/or machine readable, writable and/or executable components and/or instructions that can be stored at memory 804. For example, processing unit 806 can perform one or more operations that can be specified by computer and/or machine readable, writable and/or executable components and/or instructions including, but not limited to, logic, control, input/output (I/O), arithmetic and/or the like. In one or more embodiments, processing unit 806 can be any of one or more commercially available processors. In one or more embodiments, processing unit 806 can comprise one or more central processing unit, multi-core processor, microprocessor, dual microprocessors, microcontroller, System on a Chip (SOC), array processor, vector processor, quantum processor and/or another type of processor. The examples of processing unit 806 can be employed to implement one or more embodiments described herein.

The system bus 808 can couple system components including, but not limited to, the system memory 804 to the processing unit 806. The system bus 808 can comprise one or more types of bus structure that can further interconnect to a memory bus (with or without a memory controller), a peripheral bus and/or a local bus using one or more of a variety of commercially available bus architectures. The system memory 804 can include ROM 810 and/or RAM 812. A basic input/output system (BIOS) can be stored in a non-volatile memory such as ROM, erasable programmable read only memory (EPROM) and/or EEPROM, which BIOS contains the basic routines that help to transfer information among elements within the computer 802, such as during startup. The RAM 812 can include a high-speed RAM, such as static RAM for caching data.

The computer 802 can include an internal hard disk drive (HDD) 814 (e.g., EIDE, SATA), one or more external storage devices 816 (e.g., a magnetic floppy disk drive (FDD), a memory stick or flash drive reader, a memory card reader and/or the like) and/or a drive 820, e.g., such as a solid state drive or an optical disk drive, which can read or write from a disk 822, such as a CD-ROM disc, a DVD, a BD and/or the like. Additionally, and/or alternatively, where a solid state drive is involved, disk 822 could not be included, unless separate. While the internal HDD 814 is illustrated as located within the computer 802, the internal HDD 814 can also be configured for external use in a suitable chassis (not shown). Additionally, while not shown in operating environment 800, a solid state drive (SSD) can be used in addition to, or in place of, an HDD 814. The HDD 814, external storage device(s) 816 and drive 820 can be connected to the system bus 808 by an HDD interface 824, an external storage interface 826 and a drive interface 828, respectively. The HDD interface 824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 802, the drives and storage media accommodate the storage of any data in a suitable digital format. Although the description of computer-readable storage media above refers to respective types of storage devices, other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 812, including an operating system 830, one or more applications 832, other program modules 834 and/or program data 836. All or portions of the operating system, applications, modules and/or data can also be cached in the RAM 812. The systems and/or methods described herein can be implemented utilizing one or more commercially available operating systems and/or combinations of operating systems.

Computer 802 can optionally comprise emulation technologies. For example, a hypervisor (not shown) or other intermediary can emulate a hardware environment for operating system 830, and the emulated hardware can optionally be different from the hardware illustrated in FIG. 8. In a related embodiment, operating system 830 can comprise one virtual machine (VM) of multiple VMs hosted at computer 802. Furthermore, operating system 830 can provide runtime environments, such as the JAVA runtime environment or the .NET framework, for applications 832. Runtime environments are consistent execution environments that can allow applications 832 to run on any operating system that includes the runtime environment. Similarly, operating system 830 can support containers, and applications 832 can be in the form of containers, which are lightweight, standalone, executable packages of software that include, e.g., code, runtime, system tools, system libraries and/or settings for an application.

Further, computer 802 can be enabled with a security module, such as a trusted processing module (TPM). For instance, with a TPM, boot components hash next in time boot components and wait for a match of results to secured values before loading a next boot component. This process can take place at any layer in the code execution stack of computer 802, e.g., applied at application execution level and/or at operating system (OS) kernel level, thereby enabling security at any level of code execution.

An entity can enter and/or transmit commands and/or information into the computer 802 through one or more wired/wireless input devices, e.g., a keyboard 838, a touch screen 840 and/or a pointing device, such as a mouse 842. Other input devices (not shown) can include a microphone, an infrared (IR) remote control, a radio frequency (RF) remote control and/or other remote control, a joystick, a virtual reality controller and/or virtual reality headset, a game pad, a stylus pen, an image input device, e.g., camera (s), a gesture sensor input device, a vision movement sensor input device, an emotion or facial detection device, a biometric input device, e.g., fingerprint and/or iris scanner, and/or the like. These and other input devices can be connected to the processing unit 806 through an input device interface 844 that can be coupled to the system bus 808, but can be connected by other interfaces, such as a parallel port, an IEEE 1394 serial port, a game port, a USB port, an IR interface, a BLUETOOTH® interface and/or the like.

A monitor 846 or other type of display device can be alternatively and/or additionally connected to the system bus 808 via an interface, such as a video adapter 848. In addition to the monitor 846, a computer typically includes other peripheral output devices (not shown), such as speakers, printers and/or the like.

The computer 802 can operate in a networked environment using logical connections via wired and/or wireless communications to one or more remote computers, such as a remote computer(s) 850. The remote computer(s) 850 can be a workstation, a server computer, a router, a personal computer, portable computer, microprocessor-based entertainment appliance, a peer device and/or other common network node, and typically includes many or all of the elements described relative to the computer 802, although, for purposes of brevity, only a memory/storage device 852 is illustrated. Additionally, and/or alternatively, the computer 802 can be coupled (e.g., communicatively, electrically, operatively, optically and/or the like) to one or more external systems, sources and/or devices (e.g., classical and/or quantum computing devices, communication devices and/or like device) via a data cable (e.g., High-Definition Multimedia Interface (HDMI), recommended standard (RS) 232, Ethernet cable and/or the like).

In one or more embodiments, a network can comprise one or more wired and/or wireless networks, including, but not limited to, a cellular network, a wide area network (WAN) (e.g., the Internet), or a local area network (LAN). For example, one or more embodiments described herein can communicate with one or more external systems, sources and/or devices, for instance, computing devices (and vice versa) using virtually any specified wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, one or more embodiments described herein can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and/or software that facilitates communicating information among one or more embodiments described herein and external systems, sources and/or devices (e.g., computing devices, communication devices and/or the like).

The logical connections depicted include wired/wireless connectivity to a local area network (LAN) 854 and/or larger networks, e.g., a wide area network (WAN) 856. LAN and WAN networking environments can be commonplace in offices and companies and can facilitate enterprise-wide computer networks, such as intranets, all of which can connect to a global communications network, e.g., the Internet.

When used in a LAN networking environment, the computer 802 can be connected to the local network 854 through a wired and/or wireless communication network interface or adapter 858. The adapter 858 can facilitate wired and/or wireless communication to the LAN 854, which can also include a wireless access point (AP) disposed thereon for communicating with the adapter 858 in a wireless mode.

When used in a WAN networking environment, the computer 802 can include a modem 860 and/or can be connected to a communications server on the WAN 856 via other means for establishing communications over the WAN 856, such as by way of the Internet. The modem 860, which can be internal and/or external and a wired and/or wireless device, can be connected to the system bus 808 via the input device interface 844. In a networked environment, program modules depicted relative to the computer 802 or portions thereof can be stored in the remote memory/storage device 852. The network connections shown are merely exemplary and one or more other means of establishing a communications link among the computers can be used.

When used in either a LAN or WAN networking environment, the computer 802 can access cloud storage systems or other network-based storage systems in addition to, and/or in place of, external storage devices 816 as described above, such as but not limited to, a network virtual machine providing one or more aspects of storage and/or processing of information. Generally, a connection between the computer 802 and a cloud storage system can be established over a LAN 854 or WAN 856 e.g., by the adapter 858 or modem 860, respectively. Upon connecting the computer 802 to an associated cloud storage system, the external storage interface 826 can, such as with the aid of the adapter 858 and/or modem 860, manage storage provided by the cloud storage system as it would other types of external storage. For instance, the external storage interface 826 can be configured to provide access to cloud storage sources as if those sources were physically connected to the computer 802.

The computer 802 can be operable to communicate with any wireless devices and/or entities operatively disposed in wireless communication, e.g., a printer, scanner, desktop and/or portable computer, portable data assistant, communications satellite, telephone and/or any piece of equipment or location associated with a wirelessly detectable tag (e.g., a kiosk, news stand, store shelf and/or the like). This can include Wireless Fidelity (Wi-Fi) and BLUETOOTH® wireless technologies. Thus, the communication can be a predefined structure as with a conventional network or simply an ad hoc communication between at least two devices.

The illustrated embodiments described herein can be employed relative to distributed computing environments (e.g., cloud computing environments), such as described below with respect to FIG. 13, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 1950 described below with reference to FIG. 9, and/or with reference to the one or more functional abstraction layers (e.g., quantum software and/or the like) described below with reference to FIG. 10, to execute one or more operations in accordance with one or more embodiments described herein. For example, cloud computing environment 950 and/or one or more of the functional abstraction layers 1060, 1070, 1080 and/or 1090 can comprise one or more classical computing devices (e.g., classical computer, classical processor, virtual machine, server and/or the like), quantum hardware and/or quantum software (e.g., quantum computing device, quantum computer, quantum processor, quantum circuit simulation software, superconducting circuit and/or the like) that can be employed by one or more embodiments described herein and/or components thereof to execute one or more operations in accordance with one or more embodiments described herein. For instance, one or more embodiments described herein and/or components thereof can employ such one or more classical and/or quantum computing resources to execute one or more classical and/or quantum: mathematical function, calculation and/or equation; computing and/or processing script; algorithm; model (e.g., artificial intelligence (AI) model, machine learning (ML) model and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and/or services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can specify location at a higher level of abstraction (e.g., country, state and/or datacenter).

Rapid elasticity: capabilities can be rapidly and elastically provisioned, in one or more cases automatically, to quickly scale out and rapidly released to quickly scale in. To the consumer, the capabilities available for provisioning can appear to be unlimited and can be purchased in any quantity at any time.

Measured service: cloud systems automatically control and optimize resource use by leveraging a metering capability at one or more levels of abstraction appropriate to the type of service (e.g., storage, processing, bandwidth and/or active user accounts). Resource usage can be monitored, controlled and/or reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage and/or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems and/or storage, but has control over the deployed applications and possibly application hosting environment configurations.

Infrastructure as a Service (IaaS): the capability provided to the consumer is to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy and/or compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community or public) that remain unique entities but are bound together by standardized or proprietary technology that enables data and application portability (e.g., cloud bursting for load-balancing among clouds).

A cloud computing environment is service oriented with a focus on statelessness, low coupling, modularity and/or semantic interoperability. At the heart of cloud computing is an infrastructure that includes a network of interconnected nodes.

Moreover, the non-limiting system 100 and/or the example operating environment 800 can be associated with and/or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system and/or the like. In accordance therewith, non-limiting system 100 and/or example operating environment 800 can be employed to use hardware and/or software to solve problems that are highly technical in nature, that are not abstract and/or that cannot be performed as a set of mental acts by a human.

Referring now to details of one or more aspects illustrated at FIG. 9, the illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C and/or automobile computer system 954N can communicate. Although not illustrated in FIG. 9, cloud computing nodes 910 can further comprise a quantum platform (e.g., quantum computer, quantum hardware, quantum software and/or the like) with which local computing devices used by cloud consumers can communicate. Cloud computing nodes 910 can communicate with one another. They can be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that cloud computing nodes 910 and cloud computing environment 950 can communicate with any type of computerized device over any type of network and/or network addressable connection (e.g., using a web browser).

Referring now to details of one or more aspects illustrated at FIG. 10, a set 1000 of functional abstraction layers is shown, such as provided by cloud computing environment 950 (FIG. 19). One or more embodiments described herein can be associated with, such as accessible via, one or more functional abstraction layers described below with reference to FIG. 10 (e.g., hardware and software layer 1060, virtualization layer 1070, management layer 1080 and/or workloads layer 1090). It should be understood in advance that the components, layers and/or functions shown in FIG. 10 are intended to be illustrative only and embodiments described herein are not limited thereto. As depicted, the following layers and/or corresponding functions are provided:

Hardware and software layer 1060 can include hardware and software components. Examples of hardware components include: mainframes 1061; RISC (Reduced Instruction Set Computer) architecture-based servers 1062; servers 1063; blade servers 1064; storage devices 1065; and/or networks and/or networking components 1066. In one or more embodiments, software components can include network application server software 1067, quantum platform routing software 1068; and/or quantum software (not illustrated in FIG. 10).

Virtualization layer 1070 can provide an abstraction layer from which the following examples of virtual entities can be provided: virtual servers 1071; virtual storage 1072; virtual networks 1073, including virtual private networks; virtual applications and/or operating systems 1074; and/or virtual clients 1075.

In one example, management layer 1080 can provide the functions described below. Resource provisioning 1081 can provide dynamic procurement of computing resources and other resources that can be utilized to perform tasks within the cloud computing environment. Metering and Pricing 1082 can provide cost tracking as resources are utilized within the cloud computing environment, and/or billing and/or invoicing for consumption of these resources. In one example, these resources can include one or more application software licenses. Security can provide identity verification for cloud consumers and/or tasks, as well as protection for data and/or other resources. User (or entity) portal 1083 can provide access to the cloud computing environment for consumers and system administrators. Service level management 1084 can provide cloud computing resource allocation and/or management such that required service levels are met. Service Level Agreement (SLA) planning and fulfillment 1085 can provide pre-arrangement for, and procurement of, cloud computing resources for which a future requirement is anticipated in accordance with an SLA.

Workloads layer 1090 can provide examples of functionality for which the cloud computing environment can be utilized. Non-limiting examples of workloads and functions which can be provided from this layer include: mapping and navigation 1091; software development and lifecycle management 1092; virtual classroom education delivery 1093; data analytics processing 1094; transaction processing 1095; and/or application transformation software 1096.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules. Generally, program modules include routines, programs, components, data structures and/or the like that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
   a memory that stores computer executable components; and
   a processor that executes at least one of the computer executable components that:

provides, using a machine learning model and an interactive dialogue with a user developing a program, source code to the user to perform a functionality of a portion of the program, wherein the providing comprises iteratively, until the source code satisfying the functionality is provided:
receiving, from the user, a natural language (NL) input comprising one or more code-related attributes associated with the functionality;
generating, using the machine learning model, a query based on the natural language (NL) input;
receiving results from execution of the query;
identifying, using the machine learning model, whether the results comprise a code portion that satisfies the functionality;
in response to identifying that the results do not comprise any code portions that satisfy the functionality, presenting a clarification query to the user to elicit additional code-related attributes associated with the functionality; and
in response to identifying that the results comprise the code portion that satisfies the functionality, providing the code portion to the user.

2. The system of claim 1, wherein the identifying that the results comprise the code portion that satisfies the functionality comprises:
identifying, using the machine learning model, a result of the results that comprises candidate source code that can be modified into the code portion that satisfies the functionality.

3. The system of claim 2, wherein the identifying that the results comprise the code portion that satisfies the functionality further comprises:
modifying, using the machine learning model, based upon the one or more code-related attributes, the candidate source code into the code portion that satisfies the functionality.

4. The system of claim 1, wherein the identifying that the results comprise the code portion that satisfies the functionality comprises:
identifying, using the machine learning model, the code portion based on metadata associated with one or more labels of the code portion.

5. The system of claim 1, wherein the presenting the clarification query to the user comprises:
generating, using the machine learning model, the clarification query based on the one or more code-related attributes and the results from the execution of the query.

6. The system of claim 1, wherein the presenting the clarification query to the user comprises:
generating, using the machine learning model, a dialogue plan comprising clarification queries for eliciting the additional code-related attributes associated with the functionality.

7. The system of claim 1, wherein the at least one of the computer executable components further:
trains the machine learning model on one or more code languages.

8. A computer-implemented method, comprising:
providing, by a system operatively coupled to a processor, using a machine learning model and an interactive dialogue with a user developing a program, source code to the user to perform a functionality of a portion of the program, wherein the providing comprises iteratively, until the source code satisfying the functionality is provided:
receiving, from the user, a natural language (NL) input comprising one or more code-related attributes associated with the functionality;
generating, using the machine learning model, a query based on the natural language (NL) input;
receiving results from execution of the query;
identifying, using the machine learning model, whether the results comprise a code portion that satisfies the functionality;
in response to identifying that the results do not comprise any code portions that satisfy the functionality, presenting a clarification query to the user to elicit additional code-related attributes associated with the functionality; and
in response to identifying that the results comprise the code portion that satisfies the functionality, providing the code portion to the user.

9. The computer-implemented method of claim 8, wherein the identifying that the results comprise the code portion that satisfies the functionality comprises:
identifying, using the machine learning model, a result of the results that comprises candidate source code that can be modified into the code portion that satisfies the functionality.

10. The computer-implemented method of claim 9, wherein the identifying that the results comprise the code portion that satisfies the functionality further comprises:
modifying, using the machine learning model, based upon the one or more code-related attributes, the candidate source code into the code portion that satisfies the functionality.

11. The computer-implemented method of claim 8, wherein the identifying that the results comprise the code portion that satisfies the functionality comprises:
identifying, using the machine learning model, the code portion based on metadata associated with one or more labels of the code portion.

12. The computer-implemented method of claim 8, wherein the presenting the clarification query to the user comprises:
generating, using the machine learning model, a dialogue plan comprising clarification queries for eliciting the additional code-related attributes associated with the functionality.

13. The computer-implemented method of claim 8, wherein the presenting the clarification query to the user comprises:
generating, using the machine learning model, the clarification query based on the one or more code-related attributes and the results from the execution of the query.

14. A computer program product facilitating a process to facilitate code development, the computer program product comprising a non-transitory computer readable medium having program instructions embodied therewith, the program instructions executable by a processor to cause the processor to:
provide, using a machine learning model and an interactive dialogue with a user developing a program, source code to the user to perform a functionality of a portion of the program, wherein the providing comprises iteratively, until the source code satisfying the functionality is provided:
receiving, from the user, a natural language (NL) input comprising one or more code-related attributes associated with the functionality;

generating, using the machine learning model, a query based on the natural language (NL) input;
receiving results from execution of the query;
identifying, using the machine learning model, whether the results comprise a code portion that satisfies the functionality;
in response to identifying that the results do not comprise any code portions that satisfy the functionality, presenting a clarification query to the user to elicit additional code-related attributes associated with the functionality; and
in response to identifying that the results comprise the code portion that satisfies the functionality, providing the code portion to the user.

15. The computer program product of claim 14, wherein the identifying that the results comprise the code portion that satisfies the functionality comprises:
identifying, using the machine learning model, a result of the results that comprises candidate source code that can be modified into the code portion that satisfies the functionality.

16. The computer program product of claim 15, wherein the identifying that the results comprise the code portion that satisfies the functionality comprises:
modifying, using the machine learning model, based upon the one or more code-related attributes, the candidate source code into the code portion that satisfies the functionality.

17. The computer program product of claim 14, wherein the identifying that the results comprise the code portion that satisfies the functionality comprises:
identify, using the machine learning model, the code portion based on metadata associated with one or more labels of the code portion.

18. The computer program product of claim 14, wherein the presenting the clarification query to the user comprises:
generate, using the machine learning model, a dialogue plan comprising clarification queries for eliciting the additional code-related attributes associated with the functionality.

19. The computer program product of claim 14, wherein the presenting the clarification query to the user comprises:
generate, using the machine learning model, the clarification query based on one or more the one or more code-related attributes and the results from the execution of the query.

20. The computer program product of claim 14, wherein the program instructions are further executable by the processor to cause the processor to:
train the machine learning model on one or more code languages.

* * * * *